United States Patent
Qiao

(10) Patent No.: US 12,303,786 B2
(45) Date of Patent: May 20, 2025

(54) METHOD AND APPARATUS FOR DISPLAYING AIMING MARK

(71) Applicant: Tencent Technology (Shenzhen) Company Limited, Guangdong (CN)

(72) Inventor: Zijian Qiao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 296 days.

(21) Appl. No.: 17/954,575

(22) Filed: Sep. 28, 2022

(65) Prior Publication Data

US 2023/0030619 A1  Feb. 2, 2023

Related U.S. Application Data

(63) Continuation of application No. PCT/CN2022/072779, filed on Jan. 19, 2022.

(30) Foreign Application Priority Data

Jan. 21, 2021 (CN) .......................... 202110084109.8

(51) Int. Cl.
*A63F 13/53* (2014.01)
*A63F 13/58* (2014.01)
*A63F 13/837* (2014.01)

(52) U.S. Cl.
CPC .............. *A63F 13/53* (2014.09); *A63F 13/58* (2014.09); *A63F 13/837* (2014.09); *A63F 2300/8076* (2013.01)

(58) Field of Classification Search
CPC ........ A63F 13/53; A63F 13/58; A63F 13/837; A63F 2300/8076
See application file for complete search history.

(56) References Cited

U.S. PATENT DOCUMENTS

| 6,540,612 B1* | 4/2003 | Miyamoto | ............ A63F 13/833 463/31 |
| 8,542,910 B2* | 9/2013 | Leyvand | ................ G06V 40/10 382/106 |

(Continued)

FOREIGN PATENT DOCUMENTS

| CN | 111729309 | 10/2020 |
| CN | 112717394 | 4/2021 |

(Continued)

OTHER PUBLICATIONS

International Search Report issued Aug. 3, 2022 in International (PCT) Application No. PCT/CN2022/072779.

(Continued)

*Primary Examiner* — Steve Rowland
(74) *Attorney, Agent, or Firm* — Crowell & Moring LLP

(57) ABSTRACT

This disclosure relates to a method and apparatus for displaying an aiming mark. The method may include displaying a level interface. The level interface displays a master virtual character and at least two candidate virtual characters in a virtual environment. A candidate virtual character represents a virtual character to being aimed at by an aiming mark. The aiming mark is for marking an aimed target of the master virtual character during shooting. The method may further include displaying the aiming mark on a first virtual character of the at least two candidate virtual characters, and switching to display the aiming mark on a second virtual character of the at least two candidate virtual characters in response to a switching operation on the aimed target.

19 Claims, 8 Drawing Sheets

(56) References Cited

U.S. PATENT DOCUMENTS

| | | | |
|---|---|---|---|
| 12,096,466 B2* | 9/2024 | Zhao | H04W 72/21 |
| 2009/0013274 A1* | 1/2009 | Haghanegi | G06F 3/0489 |
| | | | 715/764 |
| 2009/0325660 A1* | 12/2009 | Langridge | A63F 13/45 |
| | | | 463/2 |
| 2010/0009733 A1* | 1/2010 | Garvin | A63F 13/10 |
| | | | 463/37 |
| 2010/0130333 A1* | 5/2010 | Strong | A63B 71/023 |
| | | | 482/83 |
| 2010/0311503 A1* | 12/2010 | McMain | A63F 13/58 |
| | | | 463/40 |
| 2011/0080475 A1* | 4/2011 | Lee | G06F 3/017 |
| | | | 382/103 |
| 2012/0051588 A1* | 3/2012 | McEldowney | G03B 21/14 |
| | | | 348/46 |
| 2013/0196767 A1* | 8/2013 | Garvin | A63F 13/422 |
| | | | 463/36 |
| 2015/0157940 A1* | 6/2015 | Hall | A63F 13/5372 |
| | | | 463/31 |
| 2015/0273331 A1* | 10/2015 | McMain | A63F 13/45 |
| | | | 463/31 |
| 2015/0375110 A1* | 12/2015 | Volkov | A63F 13/30 |
| | | | 463/2 |
| 2016/0158641 A1* | 6/2016 | Summons | A63F 13/219 |
| | | | 463/31 |
| 2017/0361230 A1* | 12/2017 | Tang | A63F 13/422 |
| 2018/0369693 A1* | 12/2018 | Rong | A63F 13/92 |
| 2021/0370170 A1 | 12/2021 | Li | |
| 2023/0381659 A1* | 11/2023 | Tsurumoto | A63F 13/49 |

FOREIGN PATENT DOCUMENTS

| | | |
|---|---|---|
| TW | 200722158 A | 6/2007 |
| WO | WO 2020/168681 A | 8/2020 |

OTHER PUBLICATIONS

Japanese office action issued on JP2023-527249 on Mar. 19, 2020, 5 pages.
Translation of Japanese office action, 7 pages.
Search Report and Office Action issued on Chinese Application 202110084109.8 on Oct. 21, 2022, 10 pages, in Chinese language with English abstract.

* cited by examiner

METHOD AND APPARATUS FOR DISPLAYING AIMING MARK

RELATED APPLICATION

This application is a continuation application of PCT Patent Application No. PCT/CN2022/072779, filed on Jan. 19, 2022, which claims priority to Chinese Patent Application No. 202110084109.8, entitled "METHOD, APPARATUS AND DEVICE FOR DISPLAYING AIMING MARK, AND STORAGE MEDIUM" and filed on Jan. 21, 2021, wherein the content of each of the above-referenced applications is incorporated herein by reference in its entirety.

FIELD OF THE TECHNOLOGY

This disclosure relates to the field of applications supporting virtual environments, and particularly relates to a method, apparatus and device for displaying an aiming mark, and a storage medium.

BACKGROUND OF THE DISCLOSURE

In a horizontal shooting game, a user needs to control a virtual character to attack enemy units near the virtual character and "kill" the enemy units, so as to "break through" to win the game.

When the user controls the virtual character to attack (or shoot) the enemy units, an automatic aiming mechanism in a client will determine an aimed target of the virtual character from multiple enemy units.

The aimed target determined by current aiming mechanisms may not conform to a subjective intention of the user.

SUMMARY

According to one aspect of this disclosure, a method for displaying an aiming mark is provided, the method including:

displaying a level interface, the level interface displaying a master virtual character and at least two candidate virtual characters in a virtual environment, a candidate virtual character representing a virtual character to being aimed at by an aiming mark, and the aiming mark being for marking an aimed target of the master virtual character during shooting;

displaying the aiming mark on a first virtual character of the at least two candidate virtual characters; and switching to display the aiming mark on a second virtual character of the at least two candidate virtual characters in response to a switching operation on the aimed target.

According to another aspect of this disclosure, an apparatus for displaying an aiming mark is provided, the apparatus including a memory operable to store computer-readable instructions, and a processor circuitry operable to read the computer-readable instructions. When executing the computer-readable instructions, the processor circuitry is configured to:

display a level interface, the level interface displaying a master virtual character and at least two candidate virtual characters in a virtual environment, a candidate virtual character representing a virtual character to being aimed at by an aiming mark, and the aiming mark being for marking an aimed target of the master virtual character during shooting;

display the aiming mark on a first virtual character of the at least two candidate virtual characters; and switch to display the aiming mark on a second virtual character of the at least two candidate virtual characters in response to a switching operation on the aimed target.

According to another aspect of this disclosure, a computer device is provided, including a processor and a memory, the memory storing at least one instruction, at least one program, a code set, or an instruction set, the at least one instruction, the at least one program, the code set, or the instruction set being loaded and executed by the processor to implement the method for displaying an aiming mark according to the foregoing aspect.

According to another aspect of this disclosure, a non-transitory machine-readable media having instructions is provided. When being executed, the instructions are configured to cause a machine to:

display a level interface, the level interface displaying a master virtual character and at least two candidate virtual characters in a virtual environment, a candidate virtual character representing a virtual character to being aimed at by an aiming mark, and the aiming mark being for marking an aimed target of the master virtual character during shooting;

display the aiming mark on a first virtual character of the at least two candidate virtual characters; and switch to display the aiming mark on a second virtual character of the at least two candidate virtual characters in response to a switching operation on the aimed target.

Beneficial effects of the technical solutions that are provided in this disclosure are at least as follows:

An aiming mark is displayed on a first virtual character in at least two candidate virtual characters, and then, the aiming mark is switched and displayed on a second virtual character according to a switching operation. When an automatic aimed target does not conform to a subjective intention of a user, a simple and quick aimed target switching mechanism is provided, so that the user may switch different virtual characters as aimed targets through a switching operation. This process is independent of other operations of the user for controlling the master virtual character, thereby reducing the complexity of the operation of the user when switching the aimed target.

DESCRIPTION OF EMBODIMENTS

Figure 1:
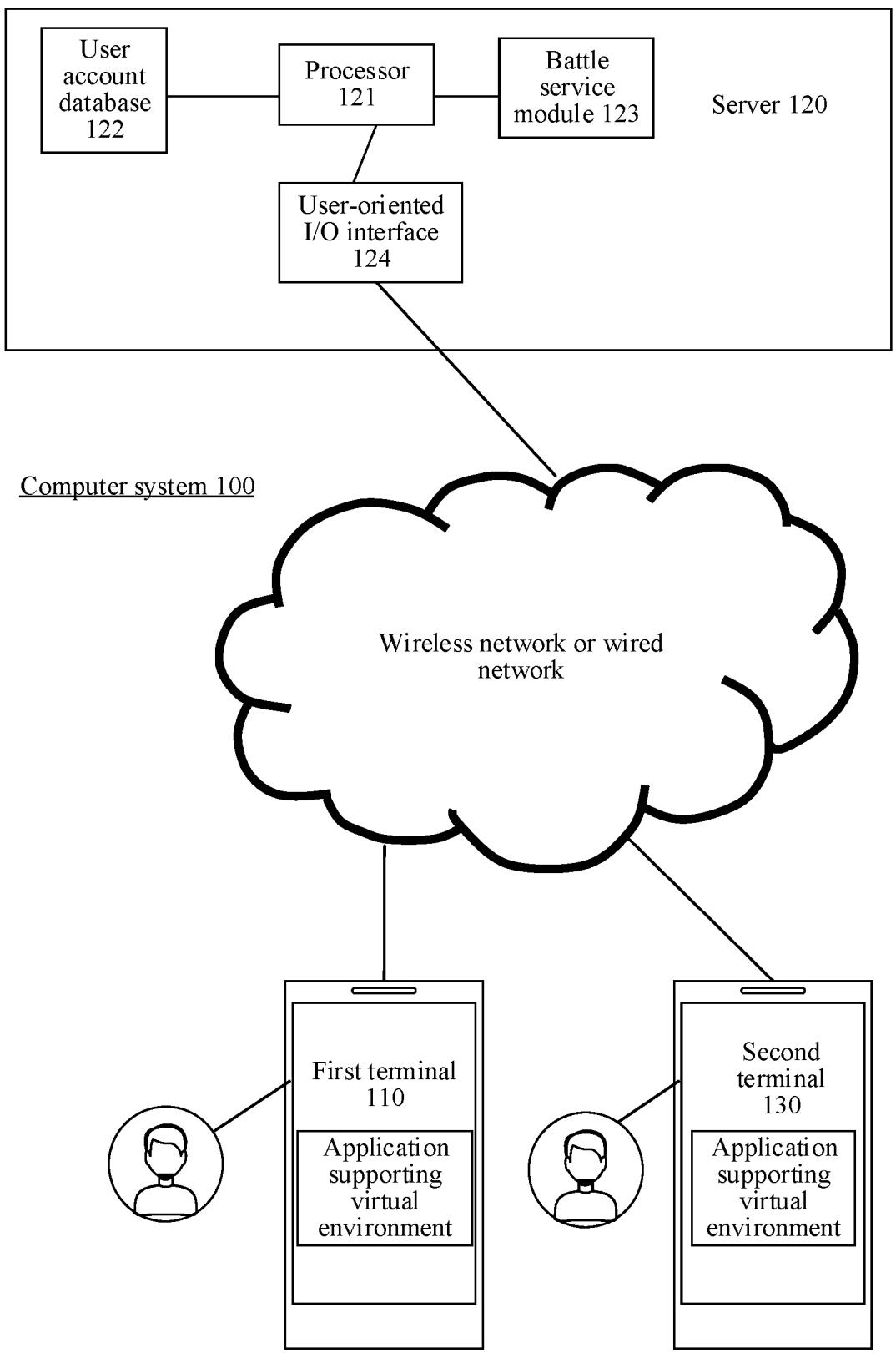
FIG. 1 is a structural block diagram of a computer system provided by an exemplary embodiment of this disclosure.

First, terms involved in the embodiments of this disclosure are introduced as follows:

Horizontal game: refers to a game in which the movement route of a game character is controlled on a horizontal image. In all or most of the pictures in the horizontal game, the movement route of the game character is along a horizontal direction. According to contents, horizontal games are divided into horizontal clearance games, horizontal adventure games, horizontal competitive games, horizontal strategy games, etc. According to technologies, horizontal games are divided into two-dimensional (2D) horizontal games and three-dimensional (3D) horizontal games.

Virtual environment: A virtual environment is displayed (or provided) by an application program when run on a terminal. The virtual environment may be a simulated environment of a real world, or may be at least one of a semi-simulated and semi-fictional environment, or may be a completely fictional environment. The virtual environment may be any one of a two-dimensional virtual environment, a 2.5-dimensional virtual environment, and a three-dimensional virtual environment. This is not limited in this embodiment of this disclosure.

The virtual environment may provide a battle environment for virtual characters.

Exemplarily, in a horizontal game, one or two virtual characters play in a single-round battle mode in a virtual environment. The virtual character escapes attacks by enemy characters and dangers (such as a poison gas area and a swamp) in the virtual environment to survive in the virtual environment. When the hit point of the virtual character in the virtual environment is zero, the life of the virtual character in the virtual environment ends, and the virtual character that successfully passes the route in the level at last is the winner. Each client may control one or more virtual characters in a virtual environment. The arena modes of the battle may include a single-player battle mode, a two-player team battle mode, or a multi-player team battle mode. The battle mode is not limited in the embodiments of this embodiment.

Exemplarily, a level image is an image in which a virtual environment is observed from a horizontal screen perspective of a virtual character, such as a shooting game in which a virtual character is observed in a vertical direction on a right side of the virtual character. The level image refers to a horizontal level image or a vertical level image, the length of the horizontal level image in a horizontal direction is not less than the length of the horizontal level image in a vertical direction, and the length of the vertical level image in a horizontal direction is not greater than the length of the vertical level image in a vertical direction. When displaying the level image, the terminal supports switching between the vertical level image and the horizontal level image. For example, when the length direction of the terminal is a horizontal direction, the terminal displays the horizontal level image; and when the length direction of the terminal changes to a vertical direction, the terminal switches the horizontal level image to display the vertical level image. There are differences in the display range of the virtual environment between the horizontal level image and the vertical level image. The above switching process is a function provided by a client on the terminal. In a process of implementing switching, the client obtains the information provided by a sensor of the terminal to judge a placement direction of the terminal, thereby determining the current mode of displaying the level image. Exemplarily, the sensor refers to a gyroscope sensor.

Virtual character: refers to at least one movable object controlled by a user in a virtual environment. The virtual character may be a virtual character, a virtual animal, or a cartoon character. The virtual character is a three-dimensional model created based on a skeletal animation technology. Each virtual role has a respective shape and size in the virtual environment, and occupies some space in the virtual environment.

The virtual characters include a master virtual character and candidate virtual characters. The master virtual character is a virtual character controlled by a current user. The candidate virtual characters refer to virtual characters capable of being aimed by an aiming mark, that is, the candidate virtual characters refer to virtual characters capable of being aimed and attacked by the master character. The candidate virtual characters include enemy characters, and the enemy characters refer to virtual characters in the opposite camp of the master virtual character in competitions (including battles). The enemy characters may be virtual characters controlled by other users, or may be non-player characters (NPCs). For example, the enemy characters may be virtual persons, virtual animals, cartoon characters, virtual monsters, virtual robots, virtual tanks, virtual planes, etc. The user may control the virtual characters to attack the enemy characters.

Virtual props: include at least one of virtual weapons, functional props and virtual equipment. Exemplarily, the virtual props in the embodiments of this disclosure refer to virtual weapons, and the virtual weapons are weapons capable of being used by virtual characters in virtual environments. Exemplarily, the virtual weapons are props which may affect the activity state or hit point of the attacked enemy characters after being used by virtual characters. The virtual weapons include cold weapons, firearms, artillery, armored combat vehicles, riot control weapons, biological and chemical weapons, nuclear weapons, new concept weapons, etc. For example, the virtual props may be knives, guns, swords, pistols, rifles, submachine guns, machine guns, special guns, shotguns, grenades, rocket launchers, mortars, tank guns, cannons, missiles, laser weapons, microwave weapons, particle beam weapons, kinetic interceptors, electromagnetic guns, pulse weapons, signal interference weapons, etc. Different virtual weapons correspond to different weapon attributes, including attack damage, attack range, attack speed, etc. When a user controls virtual characters to use different virtual weapons to attack enemy characters, different attack effects may be generated according to different weapon attributes, including a single attack against a single enemy character and an area of effect (AOE) attack against enemy characters within a certain area.

Third-person shooting game (TPS): refers to a shooting game that users may play from a third-person perspective. An image of a virtual environment in the game is an image of observing the virtual environment from the third-person perspective (that is, the user perspective). In the game, a user controls a virtual character to attack enemy characters to "kill" the enemy characters, so as to continuously "break through" to win the game. The virtual character and the enemy character have corresponding hit points, and when the hit point is 0, the virtual character or the enemy character is regarded as "killed". In the TPS, a team battle mode may be adopted to play the game. The team battle mode means that two or more users form a team to "break through", and the users respectively control their own virtual characters to attack enemy characters. The battle mode is not limited in this embodiment of this disclosure.

User interface (UI) controls: refer to any visual controls or elements that may be seen on a UI of an application, such as pictures, input boxes, text boxes, buttons, labels, etc., where some UI controls respond to user operations, for example, a user may input texts in an input box, and the user interacts with the UI through the above UI controls.

The method provided in this disclosure may be applicable to applications with virtual environments, master virtual characters and candidate virtual characters. Exemplarily, an application supporting a virtual environment is an application in which a user may control a master virtual character to move in the virtual environment and attack candidate virtual characters. Exemplarily, the method provided in this disclosure may be applicable to: a virtual reality (VR) application, an augmented reality (AR) program, a three-dimensional map program, a VR game, an AR game, a first-person shooting (FPS) game, a third-person shooting (TPS) game, a MOBA game, and a simulation game (SLG).

For example, a game based on a virtual environment includes maps of one or more game worlds. The virtual environment in the game simulates scenes in the real world. A user may control a master virtual character in the game to perform actions in the virtual environment such as walking, running, jumping, shooting, combatting, driving, and using a virtual weapon to attack enemy characters, which has relatively high interactivity. Multiple users may form a team online to play the game.

In some embodiments, the above applications may be shooting games, racing games, role-playing games, adventure games, sandbox games, battle arena games, etc. The above applications may run in at least one of the Windows Operation System, the Macintosh Operation System (Mac OS), the Android Operation System, the Iphone Operation System (IOS) and the LINUX Operation System. Applications in different operation systems may communicate with each other. The foregoing application is a program adapted to a mobile terminal having a touchscreen. The foregoing application is an application program developed based on a three-dimensional engine. For example, the three-dimensional engine is a Unity engine.

FIG. 1 is a structural block diagram of a computer system according to an exemplary embodiment of this disclosure. The computer system 100 includes: a first terminal 110 and a server 120.

An application program supporting a virtual environment is installed and run on the first terminal 110. When the application supports the above team battle mode, the computer system 100 may further include a second terminal 130. The first terminal 110 is a terminal used by a first user, and the first user uses the first terminal 110 to control a first master virtual character in a virtual environment to play a game, including at least one of adjusting the body posture of the first master virtual character, crawling, walking, running, riding, jumping, driving, attacking enemy characters, picking up virtual weapons, equipping virtual weapons, switching the currently used virtual weapons, and determining an aimed target of the first master virtual character.

The first terminal 110 is connected to the server 120 by using a wireless network or a wired network.

The server 120 includes at least one of one server, a plurality of servers, a cloud computing platform, and a virtualization center. For example, the server 120 includes a processor 121, a user account database 122, a battle service module 123, and a user-oriented input/output (I/O) interface 124. The processor 121 is configured to load instructions stored in the server 120, and process data in the user account database 122 and the battle service module 123. The user account database 122 is configured to store data of user accounts used by the first terminal 110, and the second terminal 130, for example, avatars of the user accounts, nicknames of the user accounts, and service zones of the user accounts. the battle service module 123 is configured to implement a team battle mode; the battle service module 123 is configured to implement a team battle mode; and the user-oriented I/O interface 124 is configured to establish communication with the first terminal 110 by using a wireless network or a wired network for data exchange.

Here, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The server 120 undertakes the primary computing work, and the first terminal 110 and the second terminal 130 undertake the secondary computing work. Alternatively, the server 120 undertakes the secondary computing work, and the first terminal 110 and the second terminal 130 undertake the primary computing work. Alternatively, the server 120, first terminal 110, and the second terminal 130 perform collaborative computing based on a distributed computing architecture.

An application program supporting a virtual environment is installed and run on the second terminal 130. The application supports the above team battle mode. The second terminal 130 is a terminal used by a second user, and the second user uses the second terminal 130 to control a second master virtual character located in the virtual environment to perform a game, including at least one of adjusting the body posture of the second master virtual character, crawling, walking, running, riding, jumping, driving, attacking enemy characters, picking up virtual weapons, equipping virtual weapons, switching the currently used virtual weapons, and determining an aimed target of the second master virtual character.

The first master virtual character and the second master virtual character are located in a same virtual environment.

The applications installed on the first terminal 110 and the second terminal 130 are the same, or the applications installed on the two terminals are different versions of the same application. The above different versions of the same application may be designed for different operating system platforms, or may be designed for the same operating system platform. The first terminal 110 may generally refer to one of a plurality of terminals, and the second terminal 130 may generally refer to another one of the plurality of terminals. In this embodiment, only the first terminal 110 and the second terminal 130 are used as an example for description. The device types of the first terminal 110 and the second terminal 130 are the same or different. The device types include: at least one of an AR device, a VR device, a smart wearable device, a smartphone, a tablet computer, an e-book reader, a Moving Picture Experts Group Audio Layer III (MP3) player, a Moving Picture Experts Group Audio Layer IV (MP4) player, a laptop, and a desktop computer. The following embodiment is described by using an example in which the terminal includes a smartphone. The following embodiment is described by using an example in which the terminal includes a smartphone.

A person skilled in the art may learn that there may be more or fewer terminals. For example, there may be only one terminal, or there may be dozens of or hundreds of terminals or more. The quantity and the device type of the terminals are not limited in the embodiments of this disclosure. This embodiment of this disclosure is mainly described in an application scene of a single terminal.

Figure 2:
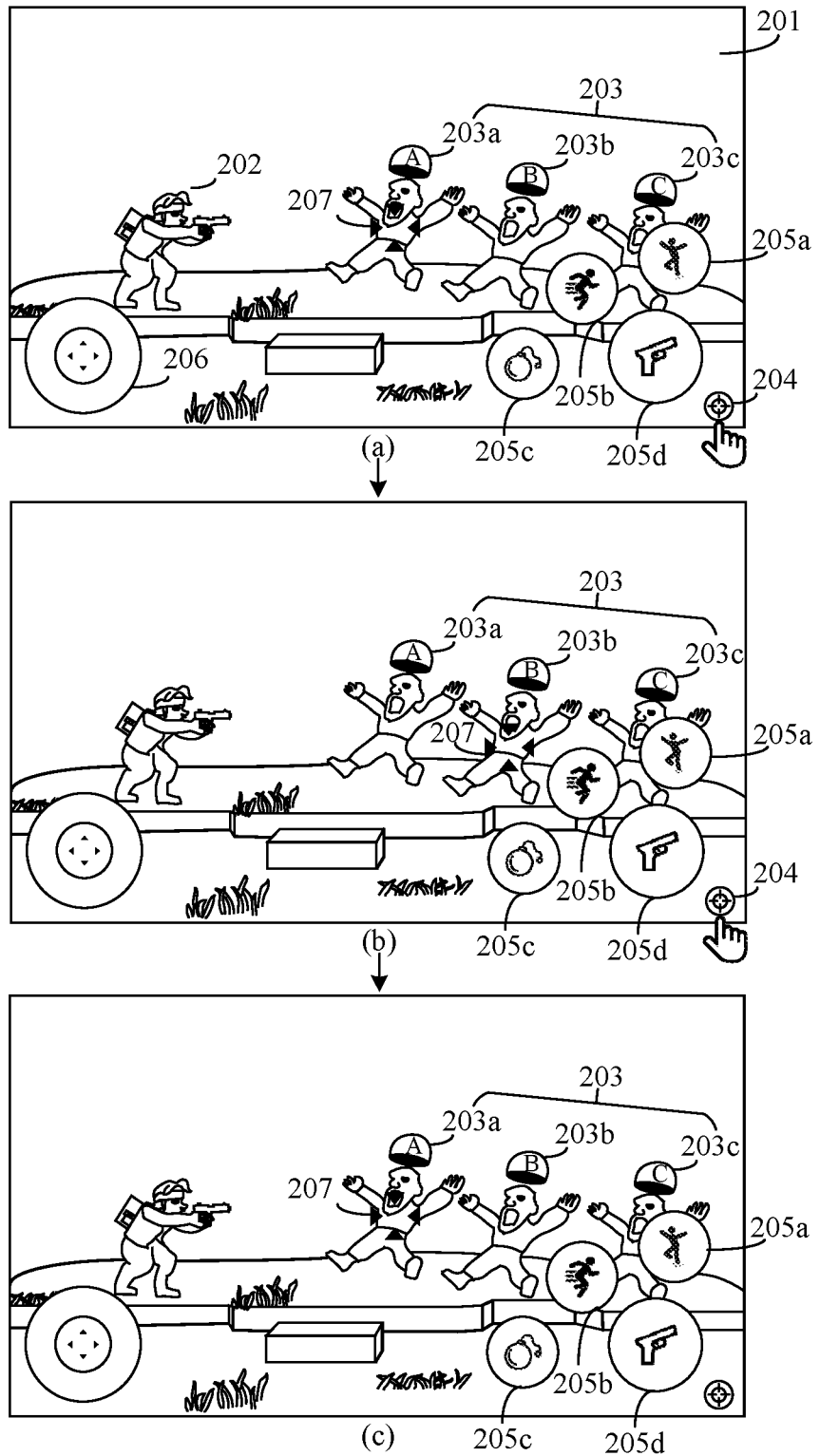
FIG. 2 is a schematic diagram of a horizontal level interface provided by an exemplary embodiment of this disclosure.

FIG. 2 is a schematic diagram of a horizontal level interface provided by an exemplary embodiment of this disclosure. As shown in FIG. 2(a), a client displays a horizontal level interface, and the horizontal level interface displays a master virtual character 202, at least two candidate virtual characters 203 (for example, including a first virtual character 203a, a second virtual character 203b and a third virtual character 203c), and an aiming switching control 204 in a virtual environment 201. The horizontal level interface further displays a control 205b for controlling the master virtual character 202 to run, a control 205a for controlling the master virtual character 202 to jump, a control 205c for controlling the master virtual character 202 to throw bombs, a control (that is, a shooting control) 205d for controlling the master virtual character 202 to shoot with a virtual weapon (pistol), and a direction control (a virtual joystick) 206 for controlling the movement and movement direction of the master virtual character 202. When a user starts a round of (or a level of) game through a client, the client will display the above horizontal level interface. Then, based on an automatic aiming mechanism, the client determines a candidate virtual character with the highest priority (such as the first virtual character 203a) in the at least two candidate virtual characters 203 as an aimed target of the master virtual character 202, and displays an aiming mark 207 on the determined aimed target. The automatic aiming mechanism is an aiming mechanism for determining a candidate virtual character at a top as an aimed target after sorting the at least two candidate virtual characters 203 according to at least one of elements in a distance between the master virtual character 202 and the candidate virtual character 203 in the virtual environment 201, a remaining hit point of the candidate virtual character 203, a percentage of the remaining hit point of the candidate virtual character 203, and a killing benefit corresponding to the candidate virtual character 203. This embodiment of this disclosure is mainly described by an automatic aiming mechanism based on the distance between the master virtual character 202 and the candidate virtual character 203 in the virtual environment 201. The distance is negatively correlated with the priority of the candidate virtual character 203, that is, the closer to the master virtual character 202 is, the higher the priority of the candidate virtual character 203 is. The distance is a distance between the master virtual character 202 and the candidate virtual character 203 in a three-dimensional virtual environment. When the automatic aiming mechanism determines the aimed target based on the distance between the master virtual character 202 and the candidate virtual character 203 in the virtual environment 201, the priority of the first virtual character 203a is higher than the priority of the second virtual character 203b, and the priority of the second virtual character 203b is higher than the priority of the third virtual character 203c. At this time, when the client receives an instruction for shooting the candidate virtual character 203, the client controls the master virtual character 202 to shoot the first virtual character 203a.

As shown in FIG. 2(b), when the client receives a switching operation triggered on the aiming switching control 204 for the first time, the client adds the currently determined aimed target (the first virtual character 203a) to a blacklist. Furthermore, when the first virtual character 203a is added to the blacklist, if a candidate virtual character already exists in the blacklist at this time, the client removes the existing candidate virtual character from the blacklist, that is, at most one candidate virtual character exists in the blacklist. Then, based on the automatic aiming mechanism, the client determines the second virtual character 203b with the highest priority from the remaining candidate virtual characters 203 as an aimed target of the master virtual character 202 at this time, and switches to display the aiming mark 207 on the second virtual character 203b. At this time, when the client receives an instruction for shooting the candidate virtual character 203, the client controls the master virtual character 202 to shoot the second virtual character 203b.

As shown in FIG. 2(c), when the client receives a switching operation triggered on the aiming switching control 204 again, the client removes the first virtual character 203a from the blacklist, and adds the currently determined aimed target (the second virtual character 203b) to the blacklist. Then, based on the automatic aiming mechanism, the client determines the first virtual character 203a with the highest priority from the remaining candidate virtual characters 203 as an aimed target of the master virtual character 202 at this time, and switches to display the aiming mark 207 on the first virtual character 203a. At this time, when the client receives an instruction for shooting the candidate virtual character 203, the client controls the master virtual character 202 to shoot the first virtual character 203a.

When the client receives a switching operation triggered on the aiming switching control 204 later, the client continues to determine an aimed target according to the above mode of receiving the switching operation again.

In addition, when an aiming failure condition is not triggered, the client maintains to display the aiming mark 207 on the aimed target currently determined based on the switching operation. For example, based on a switching operation, the client switches the determined aimed target from the first virtual character 203a to the second virtual character 203b, and at this time, the client maintains to display the aiming mark 207 on the second virtual character 203b, that is, the second virtual character 203b always serves as the aimed target. A switching operation is received again until the second virtual character 203b meets an aiming failure condition or thereafter. In a case that an aiming failure condition is not triggered, the client fixes the current aimed target at a top of an automatic aiming list, so as to maintain to display the aiming mark 207 on the current aimed target, where the automatic aiming list is a list which is updated based on an automatic aiming mechanism and is used for reflecting the priority of a candidate virtual character which is aimed. When an aiming failure condition is triggered, the client removes the candidate virtual character currently in the blacklist from the blacklist, and determines a candidate virtual character with the highest priority in the current multiple candidate virtual characters based on the automatic aiming mechanism as an aimed target at this time. For example, the current aimed target determined by the client based on a switching operation is the first virtual character 203a, and the aimed target before the switching is the second virtual character 203b. The user controls the master virtual character 202 to shoot the first virtual character 203a; and after the first virtual character 203a is killed, the client removes the second virtual character 203b from the blacklist, and determines a candidate virtual character with the highest priority (such as the second virtual character 203b) in the at least two candidate virtual characters 203 other than the first virtual character 203a based on the automatic aiming mechanism as an aimed target.

Furthermore, the client updates the automatic aiming list when an update timing is met, that is, updates the priority of each candidate virtual character. The update timing includes at least one of the following occasions: the current moment meets an update period; an instruction for controlling the master virtual character to shoot is received; and the aimed target meets an aiming failure condition. Updating the automatic aiming list will affect the priority of each candidate virtual character used by the client when determining the aimed target based on the automatic aiming mechanism, thereby affecting the finally determined aimed target.

When the master virtual character is controlled to shoot a candidate virtual character through the above mode, the client may switch the current aimed target of the master virtual character according to the switching operation and the automatic aiming mechanism. As a result, when the aimed target determined by the automatic aiming mechanism does not conform to a subjective intention of a user, a simple and quick aimed target switching mechanism may be provided. Through the combination of the switching operation of the user and the automatic aiming mechanism, the switching of the aimed target between different high-priority candidate virtual characters may be realized. This process is independent of other operations of the user for controlling the master virtual character, thereby reducing the complexity of the operation of the user when switching the aimed target.

Figure 3:
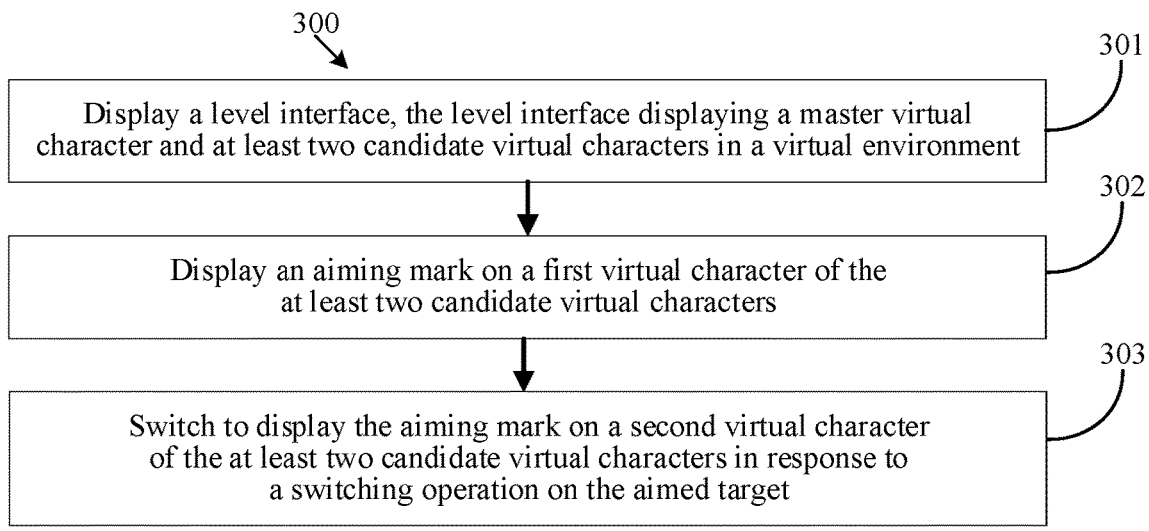
FIG. 3 is a schematic flowchart of a method for displaying an aiming mark provided by an exemplary embodiment of this disclosure.

FIG. 3 is a schematic flowchart of a method 300 for displaying an aiming mark provided by an exemplary embodiment of this disclosure. The method 300 may be used in a client running on the terminal as shown in FIG. 1, and the client is an application supporting a virtual environment. As shown in FIG. 3, the method 300 includes:

Step 301: Display a level interface, the level interface displaying a master virtual character and at least two candidate virtual characters in a virtual environment.

The level interface is an interface displayed by the client after a user starts a level of game through the client. The level interface includes a horizontal level interface or a vertical level interface, the horizontal level interface is a horizontal screen interface, and the vertical level interface is a vertical screen interface. The level interface further displays an aiming switching control, and the aiming switching control is configured to switch the aimed target of the master virtual character during shooting when being triggered. The virtual environment is a three-dimensional virtual environment. The virtual environment displayed by the client is collected through a camera model erected in the three-dimensional virtual environment. Exemplarily, the virtual environment includes at least one of a city simulation environment, a forest simulation environment, an underground space simulation environment, an underwater simulation environment, and a historical site simulation environment.

Figure 4:
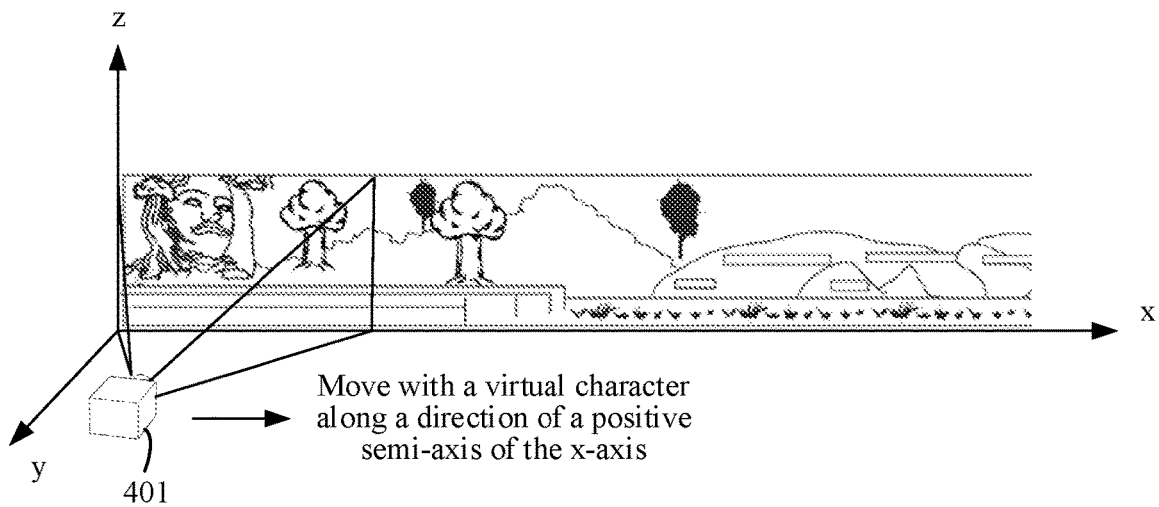
FIG. 4 is a schematic diagram of an implementation principle of displaying a virtual environment provided by an exemplary embodiment of this disclosure.

Exemplarily, as shown in FIG. 4, a collection direction of a camera model 401 erected in a three-dimensional virtual environment is perpendicular to an x-axis. Assuming that a moving route of the master virtual character in the three-dimensional virtual environment is along a positive direction of an x-axis of a world coordinate system, the horizontal level interface shown in FIG. 2 is collected by the camera model 401 with a horizontal perspective during the movement of the master virtual character along a direction of a positive semi-axis of the x-axis.

The master virtual character is a movable object in the virtual environment controlled by the user, including virtual persons, virtual animals, cartoon characters, etc. The user controls the master virtual character to shoot (attack) the candidate virtual character. The candidate virtual character is also a movable object in the virtual environment, and refers to a virtual character capable of being aimed by an aiming mark, and the aiming mark is used for marking an aimed target of the master virtual character during shooting. The candidate virtual character may be controlled by a client, such as an NPC. The candidate virtual characters include virtual persons, virtual animals, cartoon characters, virtual monsters, virtual robots, virtual tanks, virtual planes, etc. The aiming switching control is a button. The button displays a pattern of an aiming center.

The client controls the candidate virtual character through a logical resource in the client, and the logical resource includes a code resource related to a running logic. The logical resource includes, but is not limited to: at least one of a trigger logic of a candidate virtual character, a movement logic of the candidate virtual character, an attack logic of the candidate virtual character, an appearance logic of a neutral unit, an action logic of the neutral unit, a delivery logic of a flying prop, a delivery logic of a ground vehicle, a delivery logic of a robot carrier, and a reward drop logic. The specific type of the logical resource is not limited in this embodiment of this disclosure.

Continuing to refer to FIG. 2, the horizontal level interface may further display a control 205b for controlling the master virtual character to run, a control 205a for controlling the master virtual character to jump, a control 205c for controlling the master virtual character to throw bombs, a control 205d for controlling the master virtual character to shoot with a virtual weapon, and a direction control 206 for controlling the movement and movement direction of the master virtual character.

Step 302: Display an aiming mark on a first virtual character in the at least two candidate virtual characters.

The client determines the first virtual character in the at least two candidate virtual characters according to at least one of a distance between the candidate virtual character and the master virtual character, a remaining hit point of the candidate virtual character, a percentage of the remaining hit point of the candidate virtual character, and a killing benefit corresponding to the candidate virtual character, where the distance is a distance between the candidate virtual character and the master virtual character in the three-dimensional virtual environment, and the killing benefit is a benefit obtained by the master virtual character when the user controls the master virtual character to kill the candidate virtual character, including at least one of experience points, money, virtual props and attribute bonuses. Exemplarily, the client determines the priority of the candidate virtual character according to the distance between the candidate virtual character and the master virtual character, and determines the candidate virtual character with the highest priority as the first virtual character, where the distance between the candidate virtual character and the master virtual character is negatively correlated with the priority of the candidate virtual character, that is, the closer the candidate virtual character is to the master virtual character, the higher the priority is, and the farther the candidate virtual character is away from the master virtual character, the lower the priority is.

The aiming mark is used for marking an aimed target of the master virtual character during shooting. The aimed target of the master virtual character refers to a target shot by the master virtual character when the client receives an instruction for controlling the master virtual character to shoot. The master virtual character shoots the candidate virtual character through virtual weapons. The virtual weapons include cold weapons, firearms, artillery, armored combat vehicles, riot control weapons, biological and chemical weapons, nuclear weapons, new concept weapons, etc. Different virtual weapons correspond to different weapon attributes, including attack damage, attack range, attack speed, etc. When the master virtual character shoots the aimed target with a virtual weapon that may only perform single attack, it will only cause damage to the aimed target. When the master virtual character shoots the aimed target with a virtual weapon with an AOE attack effect, it will cause damage to the aimed target and also cause damage to candidate virtual characters near the aimed target. For example, the closer to the aimed target is, the greater the damage is.

When the client displays the above level interface, the client determines the first virtual character. When the level interface includes only one candidate virtual character, the client determines the candidate virtual character as an aimed target.

Exemplarily, after the client determines the aimed target, when receiving an instruction for controlling the master virtual character to shoot, the client plays an animation in which a pistol equipped by the master virtual character emits virtual bullets and the virtual bullets fly towards the aimed target, where the pistol may only perform single attack. The client determines the remaining hit point of the candidate virtual character after the master virtual character attacks the candidate virtual character according to the attack damage and attack speed of the pistol. When the remaining hit point of the candidate virtual character is 0, the candidate virtual character is regarded as "killed". Continuing to refer to FIG. 2, when the client receives a shooting operation triggered on the shooting control 205d, it determines that an instruction for controlling the master virtual character to attack is received.

Displaying the aiming mark on the first virtual character includes displaying the aiming mark on at least one of positions above the first virtual character, below the first virtual character, at the left side of the first virtual character, at the right side of the first virtual character, and in a display region of the candidate virtual character. Displaying the aiming mark in the display region of the candidate virtual character usually refers to displaying the aiming mark at the center or center of gravity of the candidate virtual character. The aiming mark may mark an aimed target so as to prompt the user to shoot the marked aimed target when controlling the master virtual character to shoot. The aiming mark is a pattern of an aiming center.

Step 303: Switch to display the aiming mark on a second virtual character in the at least two candidate virtual characters in response to a switching operation on the aimed target.

Exemplarily, the client receives a switching operation on the aimed target triggered by a physical button, switches the aimed target from the first virtual character to the second virtual character, and switches to display the aiming mark on the second virtual character. The above physical button may be set on the terminal, or may be set on an input device connected to the terminal, such as a physical button set on a gamepad, or a physical button set on a keyboard.

Exemplarily, in response to a switching operation triggered on the aiming switching control displayed on the level interface, the client switches to display the aiming mark on the second virtual character. In other words, when the client receives a touch operation on the aiming switching control, it is determined that the switching operation is received. The touch operation includes at least one of single-tap, double-tap and long-press, and the touch operation is triggered by the user's finger, a mouse or an external device.

The information used by the client for determining the second virtual character is the same as the information used for determining the first virtual character. For example, the client determines the first virtual character according to the distance between the candidate virtual character and the master virtual character, and then determines the second virtual character according to the distance between the candidate virtual character and the master virtual character. After the client determines the first virtual character, when receiving a switching operation, the client determines the candidate virtual character with the highest priority other than the first virtual character as the second virtual character. Then, when the client receives a switching operation again, the client continues to determine a new aimed target according to the above mode.

It is to be understood that the client updates the priority of the candidate virtual character when an update timing is met. The update timing includes at least one of the following occasions: the current moment meets an update period; an instruction for controlling the master virtual character to shoot is received; and the aimed target meets an aiming failure condition. Updating the priority of the candidate virtual character will affect the priority of each candidate virtual character used by the client when determining the aimed target, thereby affecting the finally determined aimed target. The update period is determined by the client, for example, updating every second. The aiming failure condition includes at least one of the following conditions: a hit point of the aimed target is zero; a distance between the aimed target and the master virtual character is greater than a maximum aiming distance; and the aimed target is removed from the level interface. For example, there is a virtual wall between the aimed target and the master virtual character. At this time, the aimed target is located outside the attack range of the master virtual character, that is, the distance between the aimed target and the master virtual character is greater than a maximum aiming distance.

Switching and displaying the aiming mark on the second virtual character by the client includes moving the aiming mark displayed on the first virtual character and then displaying the aiming mark on the second virtual character, or canceling the displaying of the aiming mark on the first virtual character and then displaying the aiming mark on the second virtual character. The aiming mark displayed on the first virtual character is the same as the aiming mark displayed on the second virtual character.

In conclusion, according to the method provided by this embodiment, an aiming mark is displayed on a first virtual character in at least two candidate virtual characters, and then, the aiming mark is switched and displayed on a second virtual character according to a switching operation. When an aimed target determined by the automatic aiming mechanism does not conform to a subjective intention of a user, a simple and quick aimed target switching mechanism is provided, so that the user may switch different high-priority candidate virtual characters in combination with the automatic aiming mechanism. This process is independent of other operations of the user for controlling the master virtual character, thereby reducing the complexity of the operation of the user when switching the aimed target.

Figure 5:
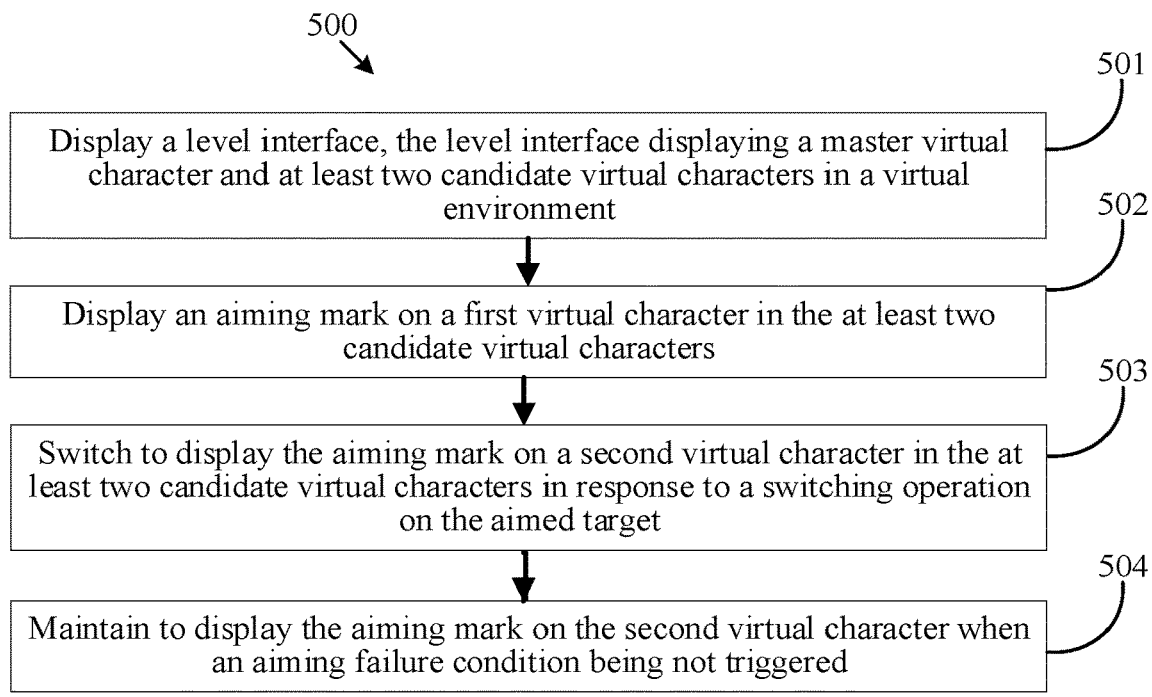
FIG. 5 is a schematic flowchart of a method for displaying an aiming mark provided by another exemplary embodiment of this disclosure.

FIG. 5 is a schematic flowchart of a method 500 for displaying an aiming mark provided by another exemplary embodiment of this disclosure. The method 500 may be used in a client running on the terminal as shown in FIG. 1, and the client is an application supporting a virtual environment. As shown in FIG. 5, the method 500 includes:

Step 501: Display a level interface, the level interface displaying a master virtual character and at least two candidate virtual characters in a virtual environment.

The detailed implementation of step 501 may refer to step 301, which will not be repeated here.

Step 502: Display an aiming mark on a first virtual character in the at least two candidate virtual characters.

Figure 6:
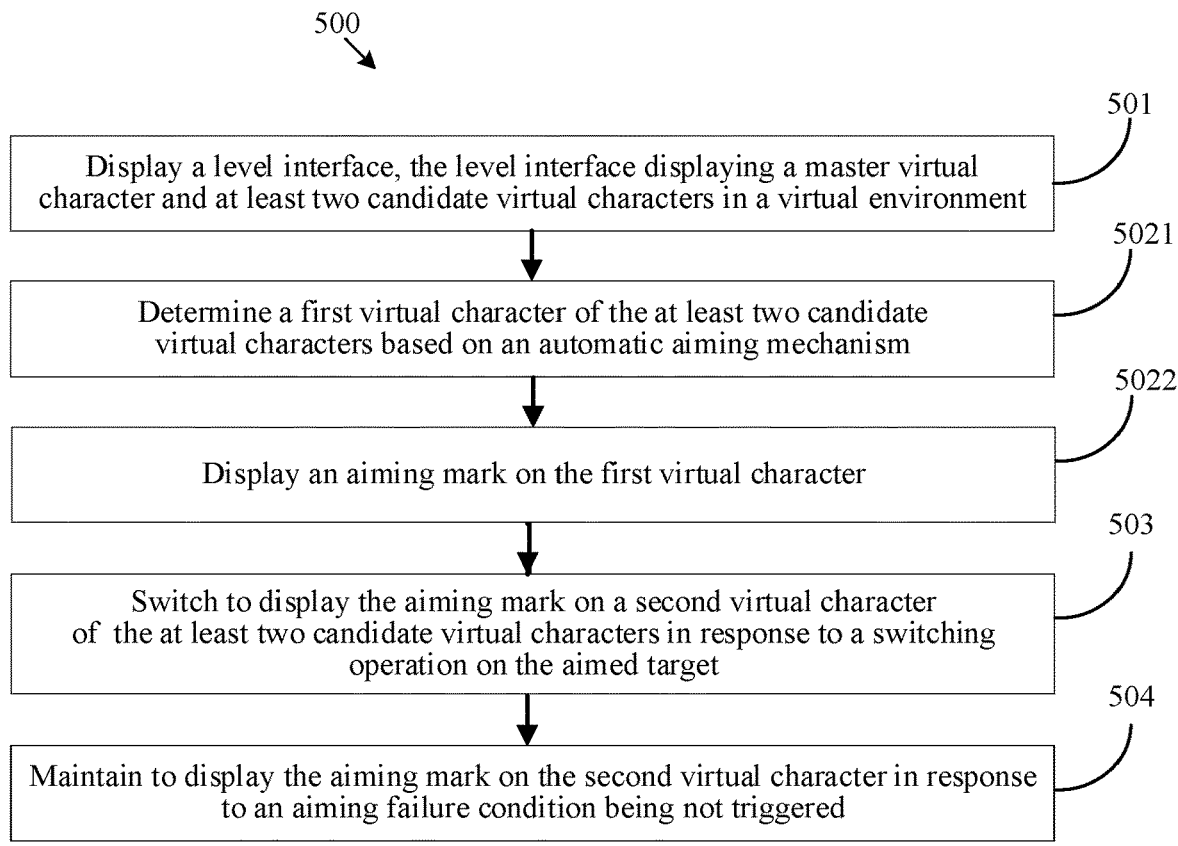
FIG. 6 is a schematic diagram of an implementation process of displaying an aiming mark on a first virtual character provided by an exemplary embodiment of this disclosure.

As shown in FIG. 6, an implementation process of step 502 includes the following steps 5021 and 5022:

Step 5021: Determine a first virtual character in the at least two candidate virtual characters based on an automatic aiming mechanism.

The first virtual character is a candidate virtual character with the highest priority determined by the automatic aiming mechanism. The automatic aiming mechanism is an aiming mechanism for determining a candidate virtual character at a top as an aimed target based on a priority order of aiming at the at least two candidate virtual characters during shooting of the master virtual character. The automatic aiming mechanism is an aiming mechanism for determining a candidate virtual character at a top as the aimed target after sorting the at least two candidate virtual characters according to at least one of elements in a distance between the master virtual character and the candidate virtual character in the virtual environment, a remaining hit point of the candidate virtual character, a percentage of the remaining hit point of the candidate virtual character, and a killing benefit corresponding to the candidate virtual character. This embodiment of this disclosure is mainly described by a distance-based automatic aiming mechanism.

When a user starts a round of (or a level of) game through a client, the client will display the above level interface and determine a first virtual character based on the automatic aiming mechanism.

The client may determine an attackable candidate virtual character within an attack range of a master virtual character in at least two candidate virtual characters. Then, the client determines the priority of the attackable candidate virtual character according to a distance between the attackable candidate virtual character and the master virtual character. The candidate virtual character displayed in the same level interface as the master virtual character may be located outside the attack range of the master virtual character. At this time, the client only determines the priority of candidate virtual character within the attack range of the master virtual character, and only determines the first virtual character in the attackable candidate virtual characters. The attack range is determined according to an attack distance of a virtual weapon equipped by the master virtual character. Different virtual weapons correspond to different attack ranges or the same attack range. For example, the attack range of a virtual pistol is smaller than the attack range of a virtual rifle.

The first virtual character determined by the client is a candidate virtual character closest to the master virtual character. The first virtual character is the aimed target of the master virtual character, and the aimed target of the master virtual character refers to a target shot by the master virtual character when the client receives an instruction for controlling the master virtual character to shoot. When the master virtual character shoots the aimed target with a virtual weapon that may only perform single attack (such as a pistol, a rifle, or a machine gun), it will only cause damage to the aimed target. When the master virtual character shoots the aimed target with a virtual weapon with an AOE attack effect (such as a bomb, a rocket launcher, or a laser launcher), it will cause damage to the aimed target and also cause damage to candidate virtual characters near the aimed target.

After determining the priorities of the candidate virtual characters, the client may further sort the candidate virtual characters according to the order of the priorities from high to low, thereby obtaining an automatic aiming list. The first candidate virtual character in the automatic aiming list is determined as the first virtual character. The automatic aiming list is a priority list updated based on the automatic aiming mechanism, which may reflect the priority of the candidate virtual character. When determining the aimed target of the master virtual character, the client determines the first candidate virtual character in the automatic aiming list as the first virtual character. An identifier of each candidate virtual character is stored in the automatic aiming list. The automatic aiming list is stored in a cache, a random access memory (RAM) or a read-only memory (ROM) of the terminal where the client is located.

Furthermore, the client updates the automatic aiming mechanism when an update timing is met, that is, updates the priority of the candidate virtual character. Updating the priority of the candidate virtual character will affect the priority of each candidate virtual character used by the client when determining the aimed target, thereby affecting the finally determined aimed target. The update timing of the automatic aiming mechanism includes at least one of the following occasions:

the current moment meets an update period;

an instruction for controlling the master virtual character to shoot is received; and the aimed target meets an aiming failure condition.

The update period is determined by the client, for example, updating every second.

The instruction for controlling the master virtual character to shoot is triggered by a touch operation on the shooting control in the level interface, or triggered by a physical button of the terminal where the client is located or an external device, or triggered by a voice instruction of a user. The aiming failure condition is a condition indicating that the aimed target exceeds an aiming range of the master virtual character, including at least one of the following conditions: a hit point of the aimed target is zero; a distance between the aimed target and the master virtual character is greater than a maximum aiming distance; and the aimed target is removed from the level interface. Exemplarily, there is a virtual wall between the aimed target and the master virtual character. At this time, the aimed target is located outside the attack range of the master virtual character, that is, the distance between the aimed target and the master virtual character is greater than a maximum aiming distance.

Step 5022: Display an aiming mark on the first virtual character.

The aiming mark is used for marking an aimed target of the master virtual character during shooting.

After determining the first virtual character, the client also continues to update the first virtual character based on the automatic aiming mechanism. For example, after the client determines the first virtual character, with the movement of the candidate virtual character, when the first virtual character is not the candidate virtual character closest to the master virtual character, the client determines the candidate virtual character closest to the master virtual character at this time as the updated first virtual character, and switches to display the aiming mark on the updated first virtual character.

Exemplarily, continuing to refer to FIG. 2(*a*), the automatic aiming list determined by the client includes a first virtual character 203*a*, a second virtual character 203*b* and a third virtual character 203*c*. The client determines the first candidate virtual character in the automatic aiming list, that is, the first virtual character 203*a*, as the aimed target, and displays the aiming mark 207 on the first virtual character 203*a*.

Step 503: Switch to display the aiming mark on a second virtual character in the at least two candidate virtual characters in response to a switching operation on the aimed target.

The priority of the second virtual character is only lower than that of the first virtual character, that is, the distance corresponding to the second virtual character is minimum in the distances between the candidate virtual characters and the master virtual character.

Figure 7:
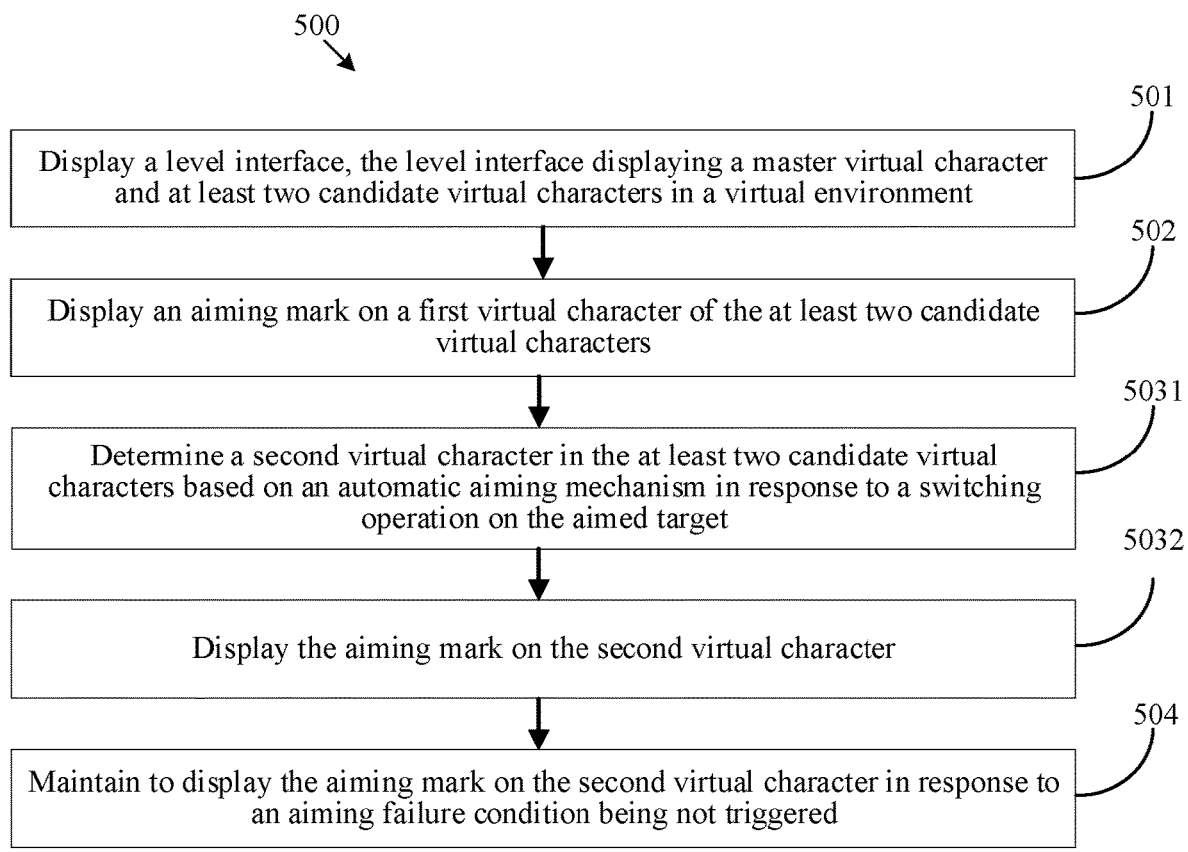
FIG. 7 is a schematic diagram of an implementation process of displaying an aiming mark on a second virtual character provided by another exemplary embodiment of this disclosure.

As shown in FIG. 7, an implementation process of step 503 includes the following steps 5031 and 5032:

Step 5031: Determine a second virtual character in the at least two candidate virtual characters based on the automatic aiming mechanism in response to a switching operation on the aimed target.

The second virtual character is a candidate virtual character with the highest priority other than the first virtual character determined by the automatic aiming mechanism. For the determination of the second virtual character, the client adds the first virtual character to the blacklist, and determines the candidate virtual character with the highest priority in the remaining virtual characters based on the automatic aiming mechanism as the second virtual character. The remaining virtual character is a candidate virtual character other than the first virtual character in the at least two candidate virtual characters.

In the process of adding the first virtual character to the blacklist by the client, when the blacklist is empty, the client directly adds the first virtual character to the blacklist; and when a third virtual character exists in the blacklist, the client removes the third virtual character from the blacklist, and adds the first virtual character to the blacklist, where the third virtual character is a candidate virtual character included in the at least two candidate virtual characters. Exemplarily, the client removes the third virtual character from the blacklist, and moves the first virtual character from the automatic aiming list into the blacklist, and if the third virtual character is closest to the master virtual character at this time, the client determines the third virtual character as the second virtual character.

When the blacklist is empty, including the condition that the candidate virtual character in the blacklist meets an aiming failure condition, that is, when the candidate virtual character in the blacklist meets an aiming failure condition, the client removes the candidate virtual character meeting an aiming failure condition from the blacklist. For example, in response to the condition that the first virtual character meets an aiming failure condition, the client removes the first virtual character which is added to the blacklist from the blacklist. Furthermore, the currently triggered switching operation is the first switching operation after starting a round of game (the candidate virtual character is not moved to the blacklist at this time). If a third virtual character exists in the blacklist, it means that the currently triggered switching operation is not the first switching operation after starting a round of game. The client removes the third virtual character from the blacklist, and at this time, when determining the second virtual character, the client may use the third virtual character as a preselected second virtual character. The first virtual character is moved to the blacklist, and at this time, when determining the second virtual character, the client does not consider the first virtual character.

The client may establish a blacklist corresponding to the automatic aiming list, and the blacklist stores an identifier of at most one candidate virtual character. The blacklist is stored in a cache, an RAM or a ROM of the terminal where the client is located. Exemplarily, the blacklist and the automatic aiming list are stored at the same position. For example, both the blacklist and the automatic aiming list are stored in the above cache, RAM or ROM. After starting a round of game, the client creates an automatic aiming list and a blacklist.

Exemplarily, continuing to refer to FIG. 2(*b*), the automatic aiming list determined by the client includes a first virtual character 203*a*, a second virtual character 203*b* and a third virtual character 203*c*. When receiving a switching operation, the client directly moves the first virtual character 203*a* to the blacklist (the first switching operation), and then, determines the candidate virtual character with the highest priority in the automatic aiming list (that is, the second virtual character 203*b*) as an aimed target at this time.

Figure 8:
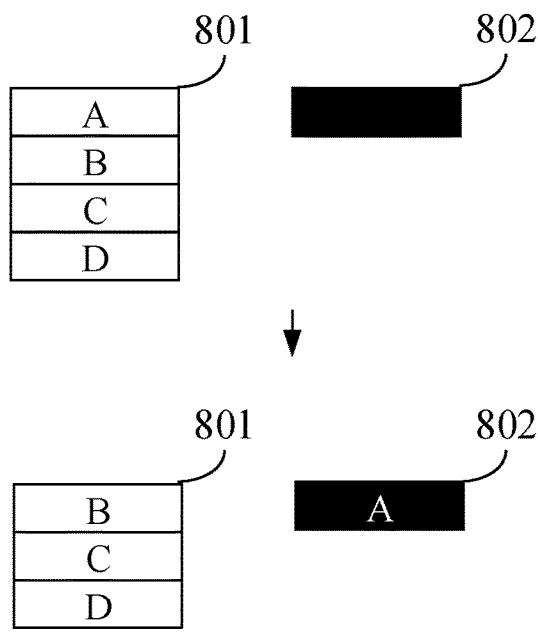
FIG. 8 is a schematic diagram of an automatic aiming list and a blacklist provided by an exemplary embodiment of this disclosure.

Exemplarily, as shown in FIG. 8, an automatic aiming list 801 determined by the client at the first moment includes A, B, C and D, a blacklist 802 is empty, and the first virtual character is A at this time. Then, the client receives a switching operation at the second moment, and at this time, the client moves A to the blacklist 802, and determines the first candidate virtual character B in the automatic aiming list 801 at this time as the second virtual character.

Step 5032: Display the aiming mark on the second virtual character.

Switching and displaying the aiming mark on the second virtual character by the client includes moving the aiming mark displayed on the first virtual character and then displaying the aiming mark on the second virtual character, or canceling the displaying of the aiming mark on the first virtual character and then displaying the aiming mark on the second virtual character. The aiming mark displayed on the first virtual character is the same as the aiming mark displayed on the second virtual character.

Step 504: Maintain to display the aiming mark on the second virtual character when an aiming failure condition is not triggered.

When an aiming failure condition is not triggered, the client fixes the second virtual character at a top of an automatic aiming list, so as to maintain to display the aiming mark on the second virtual character. The candidate virtual character fixed at the top of the automatic aiming list always serves as the aimed target before meeting an aiming failure condition and switching the aimed target next time. In other words, when the user controls the master virtual character to shoot, the master virtual character always shoots the aimed target before killing the current aimed target and performing a switching operation. The candidate virtual character fixed at the top of the automatic aiming list is an aimed target determined through a switching operation. Therefore, the aimed target is a target that the user expects to attack.

The aiming failure condition includes that the second virtual character meets an aiming failure condition, and specifically includes at least one of the following conditions:

a hit point of the second virtual character is zero;

a distance between the second virtual character and the master virtual character is greater than a maximum aiming distance; and the second virtual character is removed from the level interface.

Exemplarily, the user controls the master virtual character to attack the second virtual character, and when the hit point of the second virtual character is 0, the second virtual character meets an aiming failure condition. The second virtual character runs to one side of the virtual environment, and when the second virtual character runs out of the virtual environment and is not killed by the master virtual character, the second virtual character meets an aiming failure condition. During the movement of the second virtual character, when there is a virtual wall between the second virtual character and the master virtual character (the master virtual character may not penetrate through the wall to attack, and the distance exceeds a maximum aiming distance), the second virtual character meets an aiming failure condition.

When an aiming failure condition is triggered, the client removes the candidate virtual character currently in the blacklist from the blacklist, and thus, there is no candidate virtual character in the blacklist at this time. Then, based on the automatic aiming mechanism, the client determines a candidate virtual character with the highest priority (the first candidate virtual character in the automatic aiming list) in the candidate virtual characters as an aimed target at this time, and displays the aiming mark on the aimed target. In other words, when the client determines that the second virtual character meets an aiming failure condition, the client may further automatically determine a new aimed target for the master virtual character.

Exemplarily, the client determines the first virtual character as an aimed target and then uses the second virtual character as an aimed target according to a switching operation, and at this time, the first virtual character is in the blacklist. When the second virtual character meets an aiming failure condition, the client removes the first virtual character from the blacklist, and if the first virtual character is closest to the master virtual character at this time, the client determines the first virtual character as a new aimed target.

Figure 9:
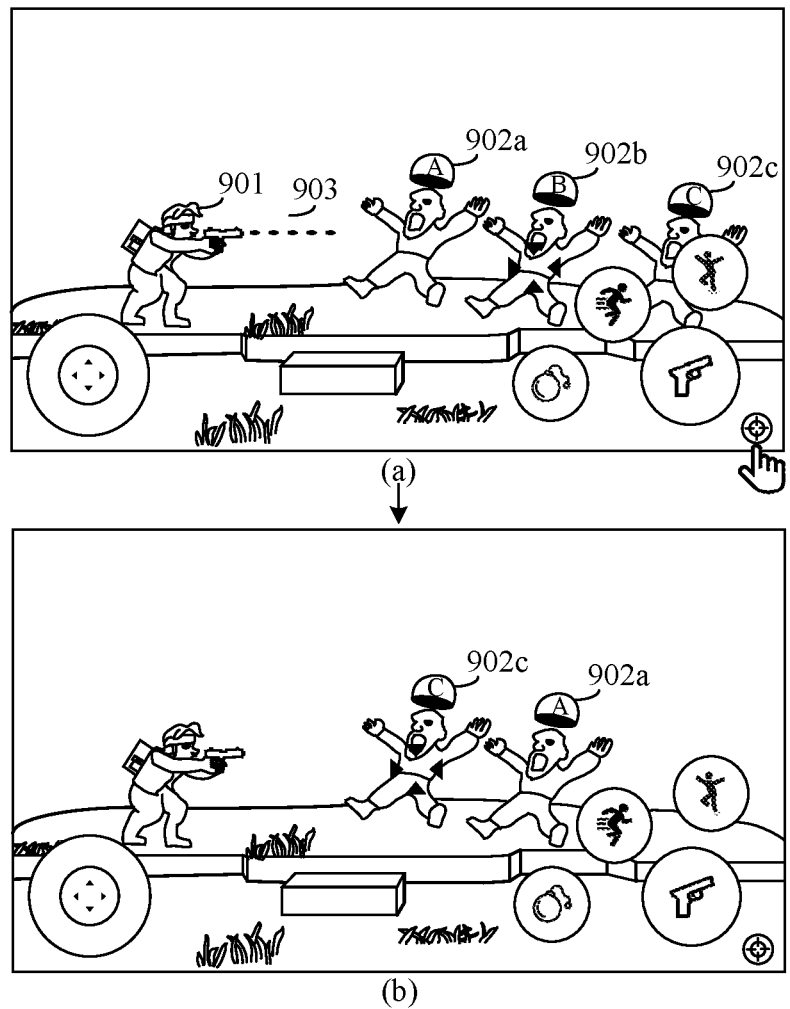
FIG. 9 is a schematic diagram of a horizontal level interface provided by another exemplary embodiment of this disclosure.

Exemplarily, FIG. 9 is a schematic diagram of a horizontal level interface provided by another exemplary embodiment of this disclosure. As shown in FIG. 9(*a*), after starting a round of game, the client determines the first virtual character 902*a* closest to a master virtual character 901 from a first virtual character 902*a*, a second virtual character 902*b* and a third virtual character 902*c* as an aimed target; and then, the client determines the second virtual character 902*b* as an aimed target according to a switching operation, and at this time, the first virtual character 902*a* is in the blacklist. According to an instruction for controlling the master virtual character to attack, the client displays an animation in which a virtual weapon of the master virtual character 901 emits virtual bullets 903, and determines a remaining hit point of the second virtual character 902*b* according to the damage of the virtual weapon. As shown in FIG. 9(*b*), when the remaining hit point of the second virtual character 902*b* is 0, the client removes the first virtual character 902*a* from the blacklist. Since a distance between the third virtual character 902*c* after moving and the master virtual character 901 is smaller than a distance between the first virtual character 902*a* and the master virtual character 901, the client determines the first candidate virtual character (with the highest priority) in the automatic aiming list, that is, the third virtual character 902*c* as an aimed target.

It is to be understood that After the user starts a round of game based on the above mode and switches the aimed target of the master virtual character for the first time, the user may continue to switch the aimed target of the master virtual character through a switching operation. An implementation process of continuing to switch the aimed target of the master virtual character may refer to the above steps 503 to 504, which will not be repeated in this disclosure.

In conclusion, according to the method provided by this embodiment, an aiming mark is displayed on a first virtual character in at least two candidate virtual characters, and then, the aiming mark is switched and displayed on a second virtual character according to a switching operation. When an aimed target determined by the automatic aiming mechanism does not conform to a subjective intention of a user, a simple and quick aimed target switching mechanism is provided, so that the user may switch different high-priority candidate virtual characters in combination with the automatic aiming mechanism. This process is independent of other operations of the user for controlling the master virtual character, thereby reducing the complexity of the operation of the user when switching the aimed target.

The method provided by this embodiment determines the aimed target of the master virtual character and switches the aimed target of the master virtual character according to the priority of the candidate virtual character based on the automatic aiming mechanism, thereby providing an automatic and quick mode for determining and switching an aimed target.

The method provided by this embodiment determines the aimed target to be switched to from the remaining virtual characters according to the priority by adding the candidate virtual characters to the blacklist without considering other factors, thereby improving the efficiency of determining the aimed target.

When the blacklist is empty or a third virtual character exists, the method provided by this embodiment updates the candidate virtual character in the blacklist in different modes to ensure that at most one candidate virtual character exists in the blacklist, so that the aimed target is switched only between two candidate virtual characters with the highest and second highest priorities. In a scene where the candidate virtual character may be quickly killed, the user may quickly switch the aimed target, thereby improving the user experience.

When the candidate virtual character in the blacklist meets an aiming failure condition, the method provided by this embodiment removes the candidate virtual character from the blacklist, so as to avoid the candidate virtual character meeting the aiming failure condition from affecting the aimed target determined by the automatic aiming mechanism.

When an aiming failure condition is not triggered, the method provided by this embodiment maintains to display the aiming mark on the second virtual character, so that the second virtual character is always attacked before the second virtual character is killed and a switching operation is performed. The second virtual character is a target that the user expects to attack, and the mechanism of always attacking the target that the user expects to attack may improve the user experience.

The method provided by this embodiment maintains to display the aiming mark on the second virtual character by fixing the second virtual character at the top of the automatic aiming list. There is no need to rely on other information, thereby improving the efficiency of determining the aimed target.

By establishing aiming failure conditions, the method provided by this embodiment automatically determines a new aimed target when an aiming failure condition is triggered, thereby avoiding the problem that the aimed target is lost.

The method provided by this embodiment always determines the candidate virtual character with the highest priority as an aimed target through the automatic aiming mechanism, so as to achieve the purposes of automatically determining the aimed target after the game starts and switching the aimed target according to a switching operation, thereby improving the accuracy and efficiency of determining the aimed target.

By updating the automatic aiming list, the method provided by this embodiment ensures that the aimed target is always determined according to the principle of the highest priority when the priority of the candidate virtual character changes, so as to ensure that the user may attack the candidate virtual character with the highest priority, thereby improving the user experience.

It is to be understood that an order of the steps in the method provided in the embodiments of the present invention may be properly adjusted, a step may also be correspondingly added or omitted according to a condition, and variations readily figured out by a person skilled in the art within the technical scope disclosed in the present invention shall fall within the protection scope of the present invention.

Figure 10:
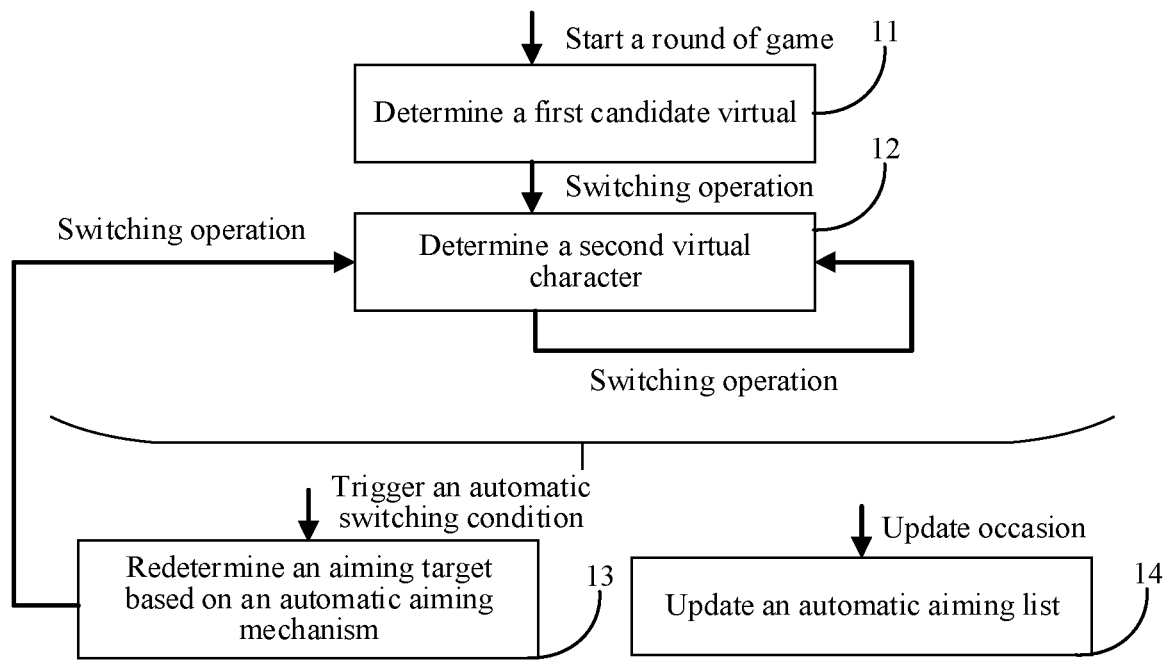
FIG. 10 is a schematic diagram of an implementation process of determining an aimed target provided by an exemplary embodiment of this disclosure.

FIG. 10 is a schematic diagram of an implementation process of determining an aimed target provided by an exemplary embodiment of this disclosure. Step 11: Establish an automatic aiming list according to a distance between the candidate virtual character and the master virtual character based on the automatic aiming mechanism when the client starts a round of game, and further establish a blacklist corresponding to the automatic aiming list; and then, determine the first candidate virtual character in the automatic aiming list as a first virtual character, and display an aiming mark on the first virtual character. Step 12: Move the first virtual character to the blacklist when a switching operation is received, determine the first candidate virtual character in the automatic aiming list at this time as a second virtual character, determine the second virtual character as an aimed target, and switch to display the aiming mark on the second virtual character. Step 13: Cyclically perform the steps of removing the candidate virtual character from the blacklist and determining the second virtual character when a switching operation is received again. In this process, when an aiming failure condition (the aimed target determined based on a switching operation meets the aiming failure condition) is triggered, the client redetermines an aimed target based on the automatic aiming mechanism, and displays the aiming mark on the newly determined aimed target. Then, when a switching operation is received, the execution continues from the step of determining the second virtual character. Step 14: Continuously update, by the client, the automatic aiming list at an update timing of the automatic aiming mechanism, that is, update the priority of the candidate virtual character, thereby affecting the determination result of each time of determining the aimed target.

In some embodiments, a continuous switching operation may be triggered in the client, and the continuous switching operation is used for triggering a function of automatically switching the aimed target continuously. Exemplarily, the continuous switching operation may be triggered by a physical button. For example, the continuous switching operation may be triggered by a specified physical button on a terminal, or triggered by a physical button on a handle, where the handle is connected with the terminal in a wired or wireless mode; or the continuous switching operation may be triggered by an aiming switching control displayed on a level interface, that is, the aiming switching control has a triggering function of the continuous switching operation.

Exemplarily, the client displays a first aiming mark on the first virtual character, and then switches the first aiming mark on the first virtual character to a second aiming mark in response to a continuous switching operation on an aimed target; and the client shoots the first virtual character in response to a first shooting operation on the aimed target, and switches to display the second aiming mark on the second virtual character. The type of the second aiming mark is different from the type of the first aiming mark. For example, the shapes of the first and second aiming marks are different, or the colors of the first and second aiming marks are different. Exemplarily, the triggering mode of the continuous switching operation is different from the triggering mode of the above switching operation. For example, the continuous switching operation is triggered by long pressing, and the switching operation is triggered by tapping.

Exemplarily, after switching and displaying the second aiming mark on the second virtual character, the client shoots the second virtual character in response to a second shooting operation on the aimed target, and switches to display the second aiming mark on the first virtual character.

The determination modes of the above first virtual character and second virtual character refer to the method provided in the above embodiment, which will not be repeated here. This switching method may switch the aimed target between the candidate virtual characters with the highest priority and the second highest priority to shoot, thereby achieving the effect of attacking multiple candidate virtual characters at the same time.

The above at least two candidate virtual characters include a third virtual character; and after switching and displaying the second aiming mark on the second virtual character, the client may further shoot the second virtual character in response to a third shooting operation on the aimed target, and switch to display the second aiming mark on the third virtual character. Exemplarily, in response to the third shooting operation on the aimed target, the client determines the third virtual character arranged after the second virtual character according to the priority order in the automatic aiming list, that is, in the at least two candidate virtual characters, the priority order of the third virtual character is ranked third, and the second aiming mark is switched and displayed on the third virtual character; then, in response to a fourth shooting operation on the aimed target, the third virtual character is shot; and when the third virtual character is the last character not shot in a round of shooting, the second aiming mark is switched and displayed on the first virtual character, where a round of shooting refers to a process of sequentially shooting at least two candidate virtual characters. In other words, the client sequentially shoots at least two candidate virtual characters according to the priority order in the automatic aiming list. Exemplarily, when candidate virtual characters exist in a blacklist, the candidate virtual characters in the blacklist are moved back to the automatic aiming list, and then a round of shooting is performed. Exemplarily, as shown above, the client may update the automatic aiming list when an update timing is met; and after the automatic aiming list is updated, the client performs a round of shooting according to the updated automatic aiming list.

Exemplarily, a shooting control is displayed on the level interface. The client may shoot the aimed target in response to a shooting operation triggered on the shooting control; or the client may shoot the aimed target in response to a shooting operation on a physical button. The aimed target refers to a candidate virtual character marked by the aiming mark during shooting of the master virtual character.

According to this switching method, at least two candidate virtual characters may be shot sequentially to achieve the effect of attacking multiple candidate virtual characters at the same time, thereby providing a game experience similar to continuous shooting for users.

Figure 11:
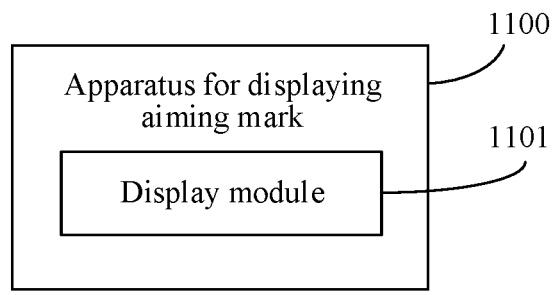
FIG. 11 is a schematic structural diagram of an apparatus for displaying an aiming mark provided by an exemplary embodiment of this disclosure.

FIG. 11 is a schematic structural diagram of an apparatus for displaying an aiming mark provided by an exemplary embodiment of this disclosure. The apparatus may be used in a client running on the terminal as shown in FIG. 1, and the client is an application supporting a virtual environment. As shown in FIG. 11, the apparatus 1100 includes:

a display module 1101 configured to display a level interface, where the level interface displays a master virtual character and at least two candidate virtual characters in a virtual environment, the candidate virtual character refers to a virtual character capable of being aimed by an aiming mark, and the aiming mark is used for marking an aimed target of the master virtual character during shooting.

The display module 1101 is configured to display the aiming mark on a first virtual character in the at least two candidate virtual characters; and the display module 1101 is configured to switch to display the aiming mark on a second virtual character in the at least two candidate virtual characters in response to a switching operation on the aimed target.

Figure 12:
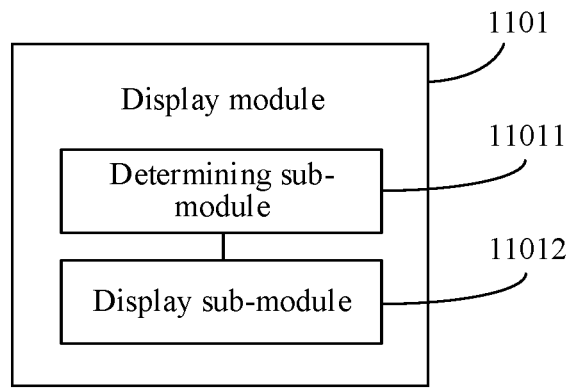
FIG. 12 is a schematic structural diagram of a display module provided by an exemplary embodiment of this disclosure.

In an exemplary implementation, as shown in FIG. 12, the display module 1101 includes:

a determining sub-module 11011 configured to determine the first virtual character in the at least two candidate virtual characters based on an automatic aiming mechanism, where the first virtual character is a candidate virtual character with the highest priority determined by the automatic aiming mechanism; and a display sub-module 11012 configured to display the aiming mark on the first virtual character.

The determining sub-module 11011 is configured to determine the second virtual character in the at least two candidate virtual characters based on the automatic aiming mechanism in response to a switching operation on the aimed target, where the second virtual character is a candidate virtual character with the highest priority other than the first virtual character determined by the automatic aiming mechanism; and the display sub-module 11012 is configured to display the aiming mark on the second virtual character.

Figure 13:
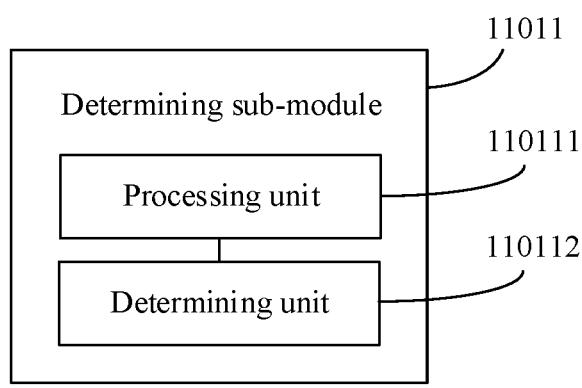
FIG. 13 is a schematic structural diagram of a determining sub-module provided by an exemplary embodiment of this disclosure.

In an exemplary implementation, as shown in FIG. 13, the determining sub-module 11011 includes:

a processing unit 110111 configured to add the first virtual character to a blacklist; and a determining unit 110112 configured to determine a candidate virtual character with the highest priority in the remaining virtual characters based on the automatic aiming mechanism as the second virtual character, where the remaining virtual character is a candidate virtual character other than the first virtual character in the at least two candidate virtual characters.

In an exemplary implementation, the processing unit 110111 is configured to directly add the first virtual character to the blacklist when the blacklist is empty.

In an exemplary implementation, the at least two candidate virtual characters include a third virtual character; and the processing unit 110111 is configured to remove the third virtual character from the blacklist when the third virtual character exists in the blacklist, and add the first virtual character to the blacklist.

In an exemplary implementation, the processing unit 110111 is configured to remove the first virtual character from the blacklist in response to the first virtual character meeting an aiming failure condition, where the aiming failure condition is a condition indicating that the aimed target exceeds an aiming range of the master virtual character.

In an exemplary implementation, the display module 1101 is configured to maintain to display the aiming mark on the second virtual character when an aiming failure condition is not triggered, where the aiming failure condition is a condition indicating that the aimed target exceeds an aiming range of the master virtual character.

In an exemplary implementation, the processing unit 110111 is configured to fix the second virtual character at a top of an automatic aiming list when the aiming failure condition is not triggered, so as to maintain to display the aiming mark on the second virtual character, where the automatic aiming list is a priority list updated based on an automatic aiming mechanism; and the automatic aiming mechanism is an aiming mechanism for determining a candidate virtual character at a top as an aimed target based on a priority order of aiming at the at least two candidate virtual characters during shooting of the master virtual character.

In an exemplary implementation, the aiming failure condition includes at least one of the following conditions:

a hit point of the second virtual character is zero;

a distance between the second virtual character and the first virtual character is greater than a maximum aiming distance; and the second virtual character is removed from the level interface.

In an exemplary implementation, the automatic aiming mechanism is an aiming mechanism for determining a candidate virtual character at a top as an aimed target after sorting the priorities of the at least two candidate virtual characters according to at least one of elements in a distance between the master virtual character and the candidate virtual character in the virtual environment, a remaining hit point of the candidate virtual character, a percentage of the remaining hit point of the candidate virtual character, and a killing benefit corresponding to the candidate virtual character.

In an exemplary implementation, the update timing of the automatic aiming mechanism includes at least one of the following occasions:

the current moment meets an update period;

an instruction for controlling the master virtual character to shoot is received; and the aimed target meets an aiming failure condition, and the aiming failure condition is a condition indicating that the aimed target exceeds an aiming range of the master virtual character.

In an exemplary implementation, a shooting control is displayed on the level interface;

the display module 1101 is configured to display a first aiming mark on the first virtual character;

the display module 1101 is configured to switch the first type of aiming mark on the first virtual character to a second aiming mark in response to a continuous switching operation on the aimed target, and the second aiming mark is different from the first aiming mark in type; and the display module 1101 is configured to shoot the first virtual character in response to a first shooting operation on the aimed target, and switch to display the second aiming mark on the second virtual character.

In an exemplary implementation, the display module 1101 is configured to shoot the second virtual character in response to a second shooting operation on the aimed target after switching and displaying the second aiming mark on the second virtual character, and switch to display the second aiming mark on the first virtual character.

In an exemplary implementation, the at least two candidate virtual characters include a third virtual character; and the display module 1101 is configured to shoot the second virtual character in response to a third shooting operation on the aimed target after switching and displaying the second aiming mark on the second virtual character, and switch to display the second aiming mark on the third virtual character.

In an exemplary implementation, the display module 1101 is configured to shoot the third virtual character in response to a fourth shooting operation on the aimed target after switching and displaying the second aiming mark on the third virtual character; and switch to display the second aiming mark on the first virtual character when the third virtual character is the last character not shot in a round of shooting, where a round of shooting refers to a process of sequentially shooting at least two candidate virtual characters.

An embodiment of this disclosure further provides a computer device, including: a processor and a memory. The memory stores at least one instruction, at least one program, a code set, or an instruction set. The at least one instruction, the at least one program, the code set, or the instruction set is loaded and executed by the processor to perform the method for displaying an aiming mark according to the foregoing method embodiments.

Figure 14:
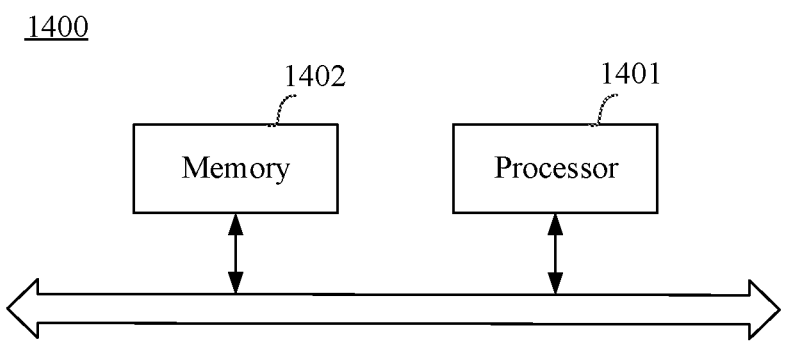
FIG. 14 is a schematic structural diagram of a terminal provided by an exemplary embodiment of this disclosure.

The computer device is a terminal. Exemplarily, FIG. 14 is a schematic structural diagram of a terminal provided by an exemplary embodiment of this disclosure.

Generally, the terminal 1400 includes: a processor 1401 and a memory 1402.

The processor 1401 may include one or more processing cores, for example, a 4-core processor or an 8-core processor. The processor 1401 may be implemented by using at least one hardware form of a digital signal processor (DSP), a field-programmable gate array (FPGA), and a programmable logic array (PLA). The processor 1401 may also include a main processor and a coprocessor. The main processor is a processor for processing data in a wake-up state, also referred to as a central processing unit (CPU). The coprocessor is a low-power processor configured to process data in a standby state. In some embodiments, a graphics processing unit (GPU) may be integrated into the processor 1401. The GPU is configured to be responsible for rendering and drawing content to be displayed on a display screen. In some embodiments, the processor 1401 may further include an artificial intelligence (AI) processor. The AI processor is configured to process computing operations related to machine learning.

The memory 1402 may include one or more computer-readable storage media that may be non-transitory. The memory 1402 may include one or more computer-readable storage media that may be non-transitory. In some embodiments, the non-transitory computer-readable storage medium in the memory 1402 is configured to store at least one instruction, and the at least one instruction being configured to be executed by the processor 1401 to implement the method for displaying an aiming mark provided in the method embodiments of this disclosure.

A person skilled in the art may understand that the structure shown in FIG. 14 does not constitute a limitation to the terminal 1400, and the terminal may include more or fewer components than those shown in the figure, or some components may be combined, or a different component deployment may be used.

An embodiment of this disclosure further provides a computer-readable storage medium, the computer-readable storage medium storing at least one piece of program code, the program code, when loaded and executed by a processor, implementing the method for displaying an aiming mark according to the foregoing method embodiments.

An embodiment of this disclosure further provides a computer-readable storage medium, the computer-readable storage medium storing at least one piece of program code, the program code, when loaded and executed by a processor, implementing the method for displaying an aiming mark according to the foregoing method embodiments. A processor of the computer device reads the computer instructions from the computer-readable storage medium and executes the computer instructions to cause the computer device to perform the method for displaying an aiming mark provided in the foregoing method embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. A method for displaying an aiming mark, wherein the method comprises:

displaying a level interface, the level interface displaying a master virtual character and at least two candidate virtual characters in a virtual environment, a candidate virtual character representing a virtual character to being aimed at by an aiming mark, and the aiming mark being for marking an aimed target of the master virtual character during shooting;

displaying the aiming mark on a first virtual character of the at least two candidate virtual characters; and switching to display the aiming mark on a second virtual character of the at least two candidate virtual characters in response to a first switching operation on the aimed target;

wherein the at least two candidate virtual characters comprise a third virtual character, and the method further comprises:

in response to a second switching operation on the aimed target, switching back to display the aiming mark on the first virtual character in lieu of the third virtual character.

2. The method according to claim 1, wherein the displaying the aiming mark on the first virtual character comprises:

determining the first virtual character of the at least two candidate virtual characters based on an automatic aiming mechanism, the first virtual character being a candidate virtual character with a highest priority determined by the automatic aiming mechanism; and displaying the aiming mark on the first virtual character;

the switching to display the aiming mark on the second virtual character comprises:

determining the second virtual character of the at least two candidate virtual characters based on the automatic aiming mechanism in response to the first switching operation on the aimed target, the second virtual character being a candidate virtual character with a highest priority other than the first virtual character determined by the automatic aiming mechanism; and displaying the aiming mark on the second virtual character.

3. The method according to claim 2, wherein the determining the second virtual character in the at least two candidate virtual characters based on the automatic aiming mechanism comprises:

adding the first virtual character to a blacklist; and determining a candidate virtual character with a highest priority in remaining virtual characters based on the automatic aiming mechanism as the second virtual character, the remaining virtual characters being candidate virtual characters other than the first virtual character in the at least two candidate virtual characters.

4. The method according to claim 3, wherein the adding the first virtual character to the blacklist comprises:

directly adding the first virtual character to the blacklist in response to the blacklist being empty.

5. The method according to claim 3, wherein the at least two candidate virtual characters comprise a third virtual character, and the adding the first virtual character to the blacklist comprises:

removing the third virtual character from the blacklist in response to the third virtual character being in the blacklist; and adding the first virtual character to the blacklist.

6. The method according to claim 3, wherein the method further comprises:

removing the first virtual character from the blacklist in response to the first virtual character meeting an aiming failure condition, the aiming failure condition indicating that the aimed target exceeds an aiming range of the master virtual character.

7. The method according to claim 1, wherein the method further comprises:

maintaining a display of the aiming mark on the second virtual character in response to an aiming failure condition being not triggered, the aiming failure condition being a condition indicating that the aimed target exceeds an aiming range of the master virtual character.

8. The method according to claim 7, wherein the maintaining the display of the aiming mark on the second virtual character comprises:

fixing the second virtual character at a top of an automatic aiming list in response to the aiming failure condition being not triggered, so as to maintain the display of the aiming mark on the second virtual character, wherein the automatic aiming list is a priority list updated based on an automatic aiming mechanism, the automatic aiming mechanism determining a candidate virtual character with a highest priority as the aimed target based on a priority order of aiming at the at least two candidate virtual characters during shooting by the master virtual character.

9. The method according to claim 7, wherein the aiming failure condition comprises at least one of the followings:

a hit point of the second virtual character is zero;

a distance between the second virtual character and the first virtual character is greater than a maximum aiming distance; or the second virtual character is removed from the level interface.

10. The method according to claim 2, wherein the automatic aiming mechanism determining a candidate virtual character with a highest priority as the aimed target based on priorities of the at least two candidate virtual characters sorted by at least one of:

a distance between the master virtual character and the candidate virtual character in the virtual environment, a remaining hit point of the candidate virtual character, a percentage of the remaining hit point of the candidate virtual character, or a killing benefit corresponding to the candidate virtual character.

11. The method according to claim 10, wherein an update timing of the automatic aiming mechanism comprises at least one of the followings:

a current moment meets an update period;

an instruction for controlling the master virtual character to shoot is received; or the aimed target meets an aiming failure condition, and the aiming failure condition being a condition indicating that the aimed target exceeds an aiming range of the master virtual character.

12. The method according to claim 1, wherein the displaying the aiming mark on the first virtual character comprises:

displaying a first aiming mark on the first virtual character;

the method further comprises:

switching the first aiming mark displayed on the first virtual character to a second aiming mark in response to a continuous switching operation on the aimed target, the second aiming mark being different from the first aiming mark in type; and shooting the first virtual character in response to a first shooting operation on the aimed target, and switching to display the second aiming mark on the second virtual character.

13. The method according to claim 12, wherein after the switching to display the second aiming mark on the second virtual character, the method further comprises:
   shooting the second virtual character in response to a second shooting operation on the aimed target, and switching to display the second aiming mark on the first virtual character.

14. The method according to claim 12, wherein the at least two candidate virtual characters comprise a third virtual character, and after the switching to display the second aiming mark on the second virtual character, the method further comprises:
   shooting the second virtual character in response to a third shooting operation on the aimed target, and switching to display the second aiming mark on the third virtual character.

15. The method according to claim 14, wherein after the switching to display the second aiming mark on the third virtual character, the method further comprises:
   shooting the third virtual character in response to a fourth shooting operation on the aimed target; and
   switching to display the second aiming mark on the first virtual character in response to the third virtual character being a last character not shot in a round of shooting, a round of shooting representing a process of sequential shooting at the at least two candidate virtual characters.

16. An apparatus for displaying an aiming mark, comprising:
   a memory operable to store computer-readable instructions; and
   a processor circuitry operable to read the computer-readable instructions, the processor circuitry when executing the computer-readable instructions is configured to:
      display a level interface, the level interface displaying a master virtual character and at least two candidate virtual characters in a virtual environment, a candidate virtual character representing a virtual character to being aimed at by an aiming mark, and the aiming mark being for marking an aimed target of the master virtual character during shooting;
      display the aiming mark on a first virtual character of the at least two candidate virtual characters; and
      switch to display the aiming mark on a second virtual character of the at least two candidate virtual characters in response to a switching operation on the aimed target;
   wherein the at least two candidate virtual characters comprise a third virtual character, and the processor circuitry is further configured to:
      in response to a second switching operation on the aimed target, switch back to display the aiming mark on the first virtual character in lieu of the third virtual character.

17. The apparatus according to claim 16, wherein the processor circuitry is configured to:
   determine the first virtual character of the at least two candidate virtual characters based on an automatic aiming mechanism, the first virtual character being a candidate virtual character with a highest priority determined by the automatic aiming mechanism; and
   display the aiming mark on the first virtual character.

18. The apparatus according to claim 17, wherein the processor circuitry is configured to:
   determine the second virtual character of the at least two candidate virtual characters based on the automatic aiming mechanism in response to the switching operation on the aimed target, the second virtual character being a candidate virtual character with a highest priority other than the first virtual character determined by the automatic aiming mechanism; and
   display the aiming mark on the second virtual character.

19. A non-transitory machine-readable media, having instructions stored on the machine-readable media, the instructions configured to, when executed, cause a machine to:
   display a level interface, the level interface displaying a master virtual character and at least two candidate virtual characters in a virtual environment, a candidate virtual character representing a virtual character to being aimed at by an aiming mark, and the aiming mark being for marking an aimed target of the master virtual character during shooting;
   display the aiming mark on a first virtual character of the at least two candidate virtual characters; and
   switch to display the aiming mark on a second virtual character of the at least two candidate virtual characters in response to a switching operation on the aimed target;
   wherein the at least two candidate virtual characters comprise a third virtual character, and the processor circuitry is further configured to:
      in response to a second switching operation on the aimed target, switch back to display the aiming mark on the first virtual character in lieu of the third virtual character.

* * * * *